US009422071B2

(12) United States Patent
Adams

(10) Patent No.: US 9,422,071 B2
(45) Date of Patent: Aug. 23, 2016

(54) AUTOMATIC, T-FOLD CARTON ERECTOR AND SEALER

(71) Applicant: Ashley John Beck Adams, Towson, MD (US)

(72) Inventor: Ashley John Beck Adams, Towson, MD (US)

( * ) Notice: Subject to any disclaimer, the term of this patent is extended or adjusted under 35 U.S.C. 154(b) by 537 days.

(21) Appl. No.: 13/948,880

(22) Filed: Jul. 23, 2013

(65) Prior Publication Data

US 2015/0027086 A1 Jan. 29, 2015

(51) Int. Cl.

| | |
|---|---|
| ***B31B 1/26*** | (2006.01) |
| ***B31B 1/36*** | (2006.01) |
| ***B31B 1/52*** | (2006.01) |
| ***B31B 1/62*** | (2006.01) |
| ***B65B 5/02*** | (2006.01) |
| ***B65B 43/08*** | (2006.01) |
| ***G05B 19/418*** | (2006.01) |
| ***B31B 1/00*** | (2006.01) |
| ***B42D 15/00*** | (2006.01) |

(52) U.S. Cl.

CPC ................. *B65B 5/024* (2013.01); *B31B 1/00* (2013.01); *B42D 15/00* (2013.01); *G05B 19/418* (2013.01); *B31B 2201/2637* (2013.01); *B31B 2201/29* (2013.01); *B31B 2201/88* (2013.01); *B31B 2203/066* (2013.01); *B31B 2203/084* (2013.01)

(58) Field of Classification Search

CPC ......... B65B 5/02; B65B 43/08; B65B 43/10; B31B 1/26; B31B 1/36; B31B 1/52; B31B 1/54; B31B 1/62; B31B 2201/0235; B31B 2201/0241; B31B 2201/0247; B31B 2201/0258; B31B 2201/26; B31B 2201/2637; B31B 2201/267; B31B 2201/2679; B31B 2201/2697; B31B 2203/08; B31B 2203/084; B31B 2203/086

USPC .................. 493/68, 69, 70, 75, 76, 79, 309, 493/128–131, 7, 13, 17, 29, 30

See application file for complete search history.

(56) References Cited

U.S. PATENT DOCUMENTS 3,253,770 A 5/1966 Black
4,003,299 A * 1/1977 Sternheimer ........... B31B 17/00 493/111
4,006,670 A * 2/1977 Royal ....................... B31B 1/44 493/10
4,308,020 A * 12/1981 Langen ..................... B31B 1/52 493/163
4,509,640 A * 4/1985 Joyce ...................... B31B 11/00 206/163
4,553,954 A * 11/1985 Sewell ...................... B31B 1/62 493/122
4,578,054 A * 3/1986 Herrin ....................... B31B 1/06 493/126
4,661,091 A * 4/1987 Moen ........................ B31B 1/44 271/10.14
5,186,706 A * 2/1993 Hartness ................... B31B 1/06 414/795.8
5,561,968 A * 10/1996 Palmer ...................... B31B 1/80 53/252
6,622,461 B2 9/2003 Gambetti (Continued)

*Primary Examiner* — Andrew M Tecco
*Assistant Examiner* — Praachi M Pathak
(74) *Attorney, Agent, or Firm* — Larry J. Guffey, Esq.; Pamela K. Riewerts, Esq.; Oliver & Grimsley, LLC

(57) ABSTRACT

An apparatus, for automatically erecting a carton for the insertion of a product and then the folding, sealing and mailing address labeling of the carton, includes: an intake mechanism with a distal head that grasps the underside of the carton blank on the bottom of the pile and pulls it down into the apparatus, guides that fold upwards some of the carton's panels when the blank is pulled down into the apparatus so as to create a partially erected carton for the insertion of the product which the carton is to package, a rotatable platform which further folds the carton and its inserted product, a glue applicator, a mailing label applicator, and a control system that controls the coordinated motion of this apparatus' various parts.

20 Claims, 10 Drawing Sheets

(56) References Cited

U.S. PATENT DOCUMENTS

| | | | | |
|---|---|---|---|---|
| 7,066,869 | B2 * | 6/2006 | Cook | B31B 7/00 493/52 |
| 7,470,225 | B2 * | 12/2008 | Herrin | B31B 1/00 493/126 |
| 7,510,517 | B2 * | 3/2009 | Goodman | 493/313 |
| 7,669,385 | B2 * | 3/2010 | Sichera | B65B 25/002 53/157 |
| 7,828,708 | B2 * | 11/2010 | Huang | B65B 43/265 493/124 |
| 8,024,910 | B2 * | 9/2011 | Graham | B31B 1/36 493/70 |
| 8,127,518 | B2 * | 3/2012 | Ford | B65B 5/024 53/376.7 |
| 8,388,507 | B2 * | 3/2013 | Herrin | B65D 5/0045 493/143 |
| 2003/0093328 | A1 * | 5/2003 | Koons | G06Q 10/087 705/26.35 |
| 2003/0104915 | A1 * | 6/2003 | Seidel | B31B 1/44 493/309 |
| 2004/0031236 | A1 * | 2/2004 | Boix Jaen | B65B 5/024 53/48.8 |
| 2006/0037290 | A1 * | 2/2006 | Smith | B65B 5/04 53/566 |
| 2009/0239726 | A1 * | 9/2009 | Huang | B31B 1/06 493/309 |
| 2010/0001056 | A1 * | 1/2010 | Chandaria | B31B 1/88 229/198.2 |
| 2014/0138277 | A1 * | 5/2014 | Raming | G09F 3/0288 206/459.5 |
| 2015/0166249 | A1 * | 6/2015 | McDonald | B65D 83/0858 206/758 |
| 2015/0224731 | A1 * | 8/2015 | Ponti | B31B 1/00 493/59 |
| 2015/0360801 | A1 * | 12/2015 | Sytema | B31B 1/25 53/74 |
| 2015/0367974 | A1 * | 12/2015 | Sytema | B65B 43/14 53/461 |

* cited by examiner

AUTOMATIC, T-FOLD CARTON ERECTOR AND SEALER

BACKGROUND OF THE INVENTION

1. Field of the Invention

The present invention relates generally to package making machines. More particularly, the present invention is directed to an apparatus that takes as input a t-fold, carton blank and partially erects it so that a product can be inserted into it, and then finishes folding and sealing the carton to which a mailing label can be added.

2. Description of the Related Art

Packaging systems are an important aspect of manufacturing. A significant expense in manufacturing is the erecting of a packaging case from a blank, packing the case with product, and sealing the case after filling. Cases include, for example, containers, boxes, cartons and similar packages for containing product, which are made of paper, cardboard and similar materials. Until comparatively recent times, human hands have often performed the tasks of assembling, packing and sealing cases.

Meanwhile, it is well known that case blanks or unassembled cases are available in a wide range of configurations. See, for example, U.S. Pat. Nos. 3,253,770 and 8,234,844 which show, respectively, the blanks for a nine and seven panel, pre-creased (i.e., to establish the fold lines which delineate the panels) cartons. Typically, the erecting and sealing of a regular, slotted or pre-creased to establish the panel's fold lines, multi-panel carton or container proceeds along the following lines; from an initial flattened condition, the side panels that extend from a bottom panel are folded upwards into a box-like or rectangular configuration and glue or tape is applied to specified flap surfaces that are used to join the side surfaces together. A product is usually inserted at this time into this partially assembled carton or container. The top panel and its flaps are then folded inwardly and glue or tape is again applied.

Packaging lines for erecting, filling and sealing large quantities of cases that are all going to the same address, possibly by a truck shipment, are well known in the art. See, for example, U.S. Pat. Nos. 8,388,507, 8,387,349, 7,828,708, 7,669,385, 7,510,517, and 6,622,461. However, there exist no such apparatuses that can handle both the packaging and the labeling requirements when the packages are all going to, for example, different mailing addresses. For smaller customer orders that require the shipment of only a limited number of products to any particular customer, many manufacturers still erect these blank cases by hand, then fill the partially assembled cases with product, and finally close, seal and manually attach a mailing label to the product-containing, assembled cases.

However, with manpower costs continuing to rise, there is an ever increasing demand for new and improved automated systems or apparatuses that can reduce the manpower resources needed to erect or assemble, pack, seal and label shipping containers or cartons. Thus, despite of a wide assortment of packaging machines, there still exists a need for new and improved automated packaging systems.

SUMMARY OF THE INVENTION

Recognizing the need for the development of a new and improved automated apparatus that can reduce the manpower resources needed to erect, seal and affix mailing labels to shipping containers or cartons, the present invention is generally directed to satisfying this need.

In accordance with a variant of a preferred embodiment of the present invention, an apparatus for automatically erecting, from a t-fold, carton blank that serves as the input for the apparatus, a carton for the insertion of a product and then the folding, sealing and mailing address labeling of said carton, includes: a vertical drive with a vacuum suction head that grasps the underside of the carton blank that's on the bottom of the pile and pulls it down into the apparatus, guides that fold upwards some of the carton's panels when the blank is pulled down into the apparatus so as to create a partially erected carton for the insertion of the product which the carton is to package, a rotatable platform which further folds the carton and its inserted product, a glue applicator, a mailing label applicator, and a control system that controls the coordinated motion of this apparatus' various parts.

In another variant of this preferred embodiment, this control system has a plurality of sensors and a programmable controller which has a configuration adapted to initiate the action of the apparatus only after the programmable controller receives from an external source a request for the creation of a "validated" mailing label. Wherein, a "validated" mailing label request is one that has been checked to ensure that it is fully valid (i.e., it has been checked to assure: (i) that the product's cost has been or will be paid, (ii) that the product is in stock and ready to be shipped, and (iii) the mailing address to which the product is to be shipped is valid).

In yet another variant of this preferred embodiment, the t-fold, carton blank to be used by the apparatus has nine panels, each of which has a proximal and a distal surface that are named such that the proximal side of any panel is the one which is closest to the packaged product in the sealed carton. These nine panels include an outer top, a rear side, an outer bottom, a front side, an inner top, a right side, a left side, an inner bottom right flap and an inner bottom left flap.

This variant of the apparatus then includes: (a) a frame having a configuration adapted to hold a plurality of these carton blanks on the frame's top surface, wherein this frame also has a defined orthogonal set of axes with a x-axis that extends from the frame's left to right side, a y-axis that extends from the frame's bottom to top surfaces, and a z-axis that extends from the frame's rear to front surfaces, (b) a vertical drive having a distal end to which is attached a vacuum suction head having a configuration adapted to enable this vacuum suction head to grasp the distal side of the carton blank when it is located on the frame's top surface and pull it down into the apparatus, (c) a rear guide having a configuration adapted to fold upwards the carton blank's top and rear side panels when the blank is pulled down into the apparatus so as to create a partially erected carton for the insertion of the product onto the proximal side of the carton's inner top panel, (d) a right side guide having a configuration adapted to fold upwards the inner bottom, right flap and right side panel when the blank is pulled down into the apparatus, (e) a left side guide having a configuration adapted to fold upwards the inner bottom, left flap and left side panel when the blank is pulled down into the apparatus.

This variant of the apparatus further includes: (f) a rotatable platform having a configuration adapted to situate the rotatable platform's top surface below the distal side of the carton's inner top panel when the carton blank is pulled down into the apparatus, with this rotatable platform also having a mounting arrangement adapted to affix the rotatable platform to the frame so that the rotatable platform rotates about its axis of rotation which is parallel to the frame's x-axis, (g) a pair of movable pushers affixed to the rotatable platform and having a configuration adapted to move the pushers towards each other in such a manner as to fold down the carton's inner bottom right and inner bottom left flaps towards each other so that they lie on the top of the inserted product that was placed onto the proximal side of the carton's inner top panel, and wherein the configuration of this mounting arrangement is further adapted to allow the platform to move through an angle that is sufficient to situate the partially-erected carton above the carton's outer bottom panel, (h) a glue applicator having a configuration adapted to apply glue to the distal side of the carton's inner top panel, (i) a mailing label applicator having a vertically movable head and a configuration adapted to move this head downward to come into contact with the distal side of the carton's outer top panel and affix a mailing label to it, and (j) a control system having a plurality of sensors and a programmable controller which has a configuration adapted to control the coordinated actions of this apparatus' various parts.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Before explaining at least one embodiment of the present invention 1 in detail, it is to be understood that the invention is not limited in its application to the details of construction and to the arrangements of the components set forth in the following description or illustrated in the applications drawings or figures. The invention is capable of other embodiments and of being practiced and carried out in various ways. Also, it is to be understood that the phraseology and terminology employed herein are for the purpose of description and should not be regarded as limiting.

A preferred embodiment of the present invention 1 can take the form of an apparatus or machine for initially, partially erecting, from a flat, multi-paneled, packaging carton blank that has impressed fold lines that separate its panels and which serves as the raw material input for the apparatus, a carton which has enough structural integrity to allow it to hold in place the product which this packing carton is to protect during its personalized shipment to a customer. The product can be inserted either manually or automatically. After the product is inserted, the apparatus completes the task of erecting this carton by folding the remaining panels around the product, except for one panel which is held at an angle to the underlying panel on which it will eventually rest. Keeping these panels separated at this time is for the purpose of allowing a glue applicator access to the underlying panel so that glue can be applied to this underlying panel. Once this glue has been applied, the apparatus presses down the panel that was being held at an angle so that it comes into contact with the underlying panel to interact with the applied glue and seal the package. Since these folding and gluing steps occur in different work areas of the apparatus, it has a transport or conveyor system that moves the carton and its inserted product between these different work areas. This apparatus also has a third working area in which a mailing label is printed and attached to the now sealed package before it is exited from the apparatus.

This apparatus is sufficiently flexible in its configuration that it can accommodate a wide range of multi-panel, carton blanks. It is especially useful in those applications where the manufacturer or shipper must package and send many products that are each going to a different address but which are similarly sized so that each of these products can go into the same size and type of carton.

Figure 1A:
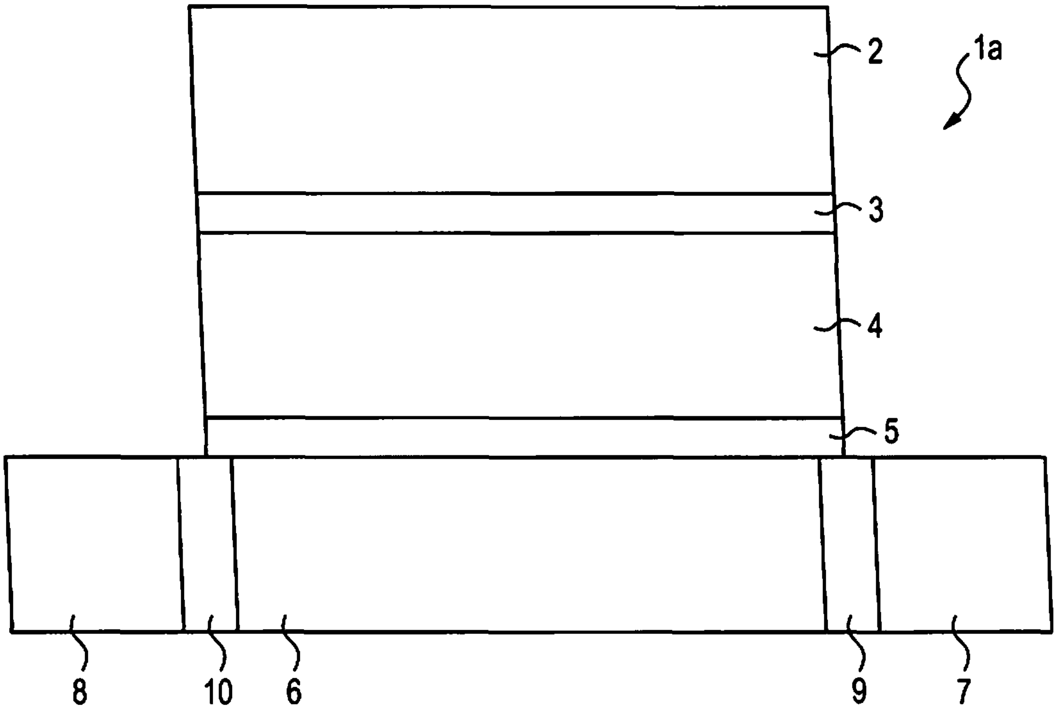
FIG. 1A illustrates a flat, un-erected, nine-panel, T-fold, carton blank that is suitable for use as an input material for the apparatus of the present invention.
Figure 1B:
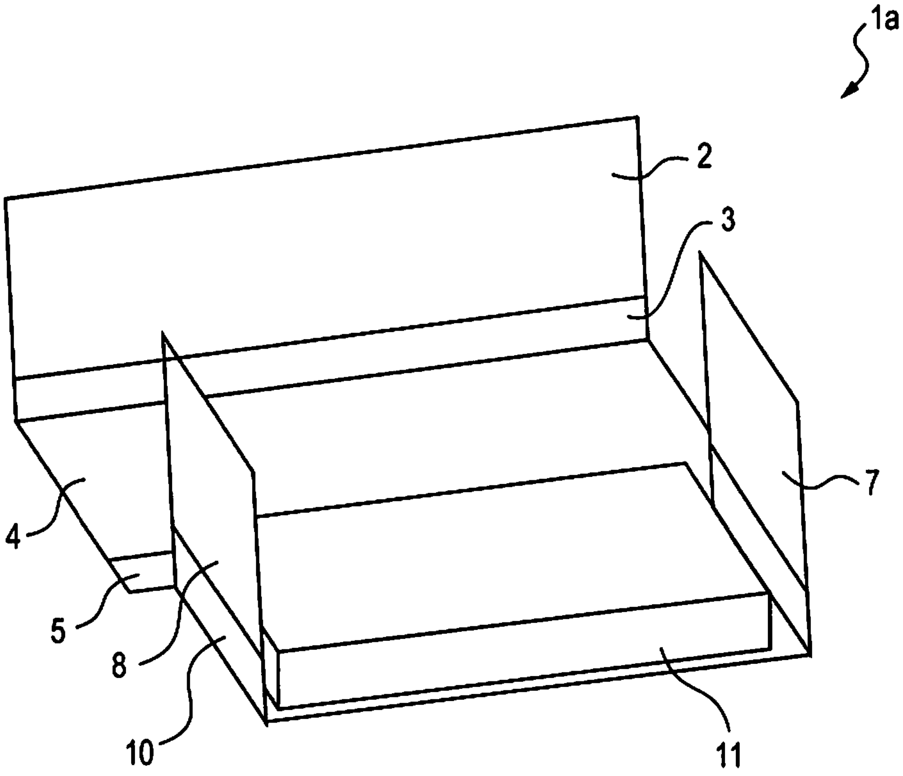
FIG. 1B illustrates the carton blank of FIG. 1A after it has been partially erected by having some of its panels folded 90 degrees upward and a product inserted so that it lies within this partially erected carton.

FIG. 1A shows a flat, un-erected, nine-panel, T-fold, carton blank 1*a* that is suitable for use as an input material for the present invention. To describe how this blank is erected into its final form as a sealed carton, it is useful to give names to this carton's panels. These are shown in FIG. 1A, where the panel names are chosen to denote the orientation that these panels will have when the carton is fully erected; thus, we have an outer top 2, a rear side 3, an outer bottom 4, a front side 5, an inner top 6, a right side 7, a left side 8 and inner bottom right 9 and left side 10 panels or flaps. Note that the blank gets the t-fold part of its name due to the fact that its right 7 and left 8 side panels and its inner bottom right 9 and left side 10 flaps extend to the sides of its other panels which are aligned in a rectangular shape. Since each of these panels has two sides or surfaces, it prove useful to define them as a proximal and distal surfaces with the proximal side of any panel being defined to be the one which is closest to an inserted product. It follows that the side of any panel which is the furthest from an inserted product is the distal side of a panel. FIG. 1B shows this carton blank after it has been partially erected by having its outer top 2, rear side 3, inner bottom right 9 and left side 10 panels folded 90 degrees upward and a product 11 inserted so that it lies on the carton's inner top 6 panel.

Figure 2:
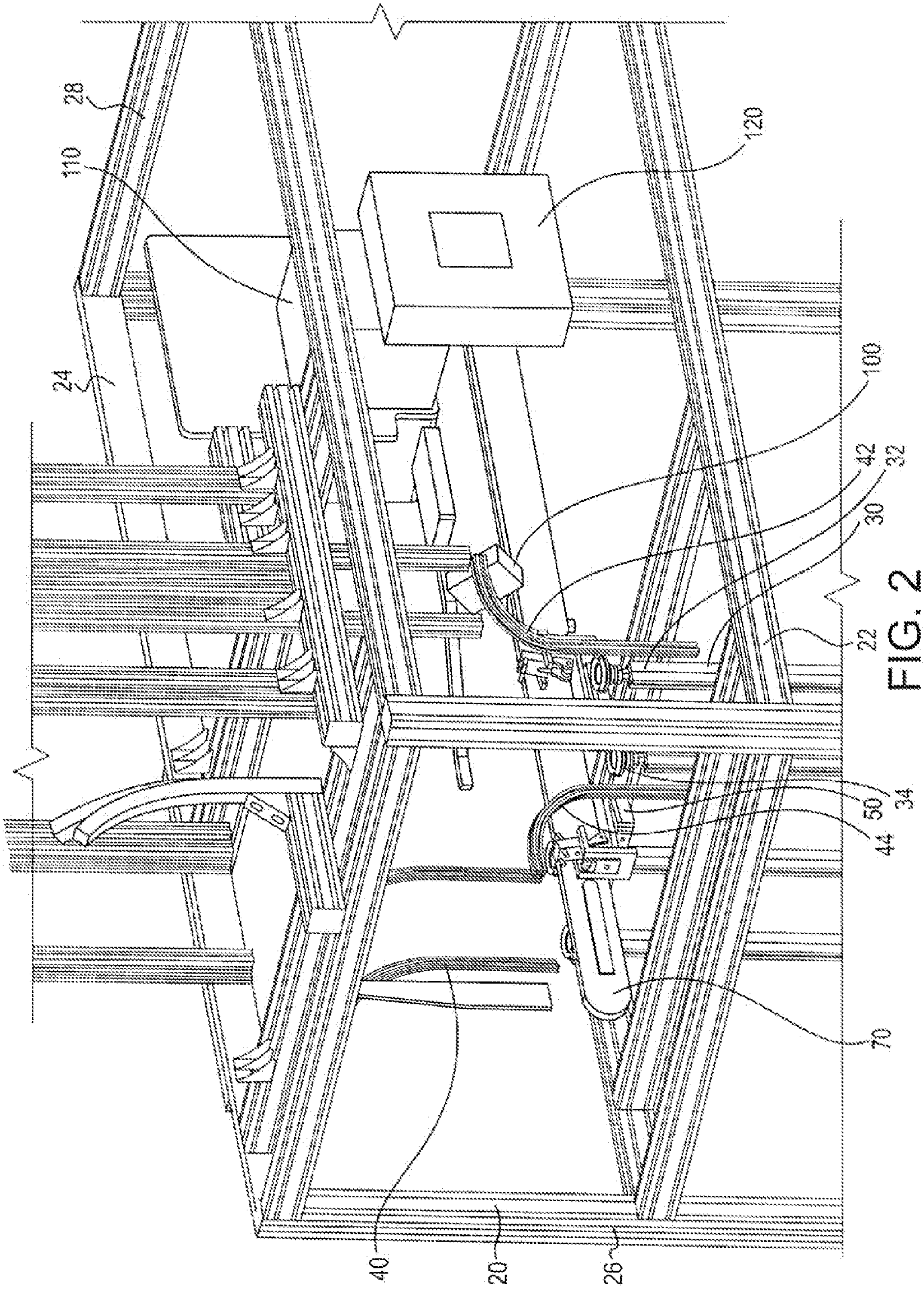
FIG. 2 shows a perspective view of an apparatus according to the present invention which can automatically erect the carton blank shown in FIGS. 1A and 1B and then the fold, seal and affix a mailing address label to this packaging-containing carton.

FIG. 2 shows a perspective view of an apparatus according to the present invention 1 which can automatically erect the carton blank shown in FIGS. 1A and 1B to a carton for the insertion of a product and then the folding, sealing and mailing address labeling of this carton. This apparatus includes a frame 20 which has front 22, top 24, left 26 and right 28 side surfaces that form some of the boundaries for one or more working areas of the apparatus. This frame generally has a configuration that is adapted to hold horizontally a hopper full of these t-fold, carton blanks 1*a* on the top surface 24 of the frame and above a first working area 20*a* of the frame. Alternatively, this hopper oft-fold, carton blanks could sit behind or to the side of the frame and be brought into the frame by the motion of an appropriately configured mechanical arm.

To describe this frame and how a carton progresses through it, it is helpful to define a set of orthogonal axes for this frame. Thus, we define the x-axis of this set as extending from said left 26 to the right 28 side of this frame, a y-axis that extends from the bottom to the top 24 of the frame, and a z-axis that extends from back to the front 22 of the frame.

The blanks are pulled down into the first working area 20*a* by utilizing an intake mechanism 30 which is situated below this first working area 20*a* and which has a plurality of elongated tubular structures that each have a distal end 32. Attached to each of these is a vacuum suction head or clamping device 34 which has a configuration adapted to enable it to grasp the underside of the carton blank and move or pull it down into this first working area of the apparatus.

Figure 3:
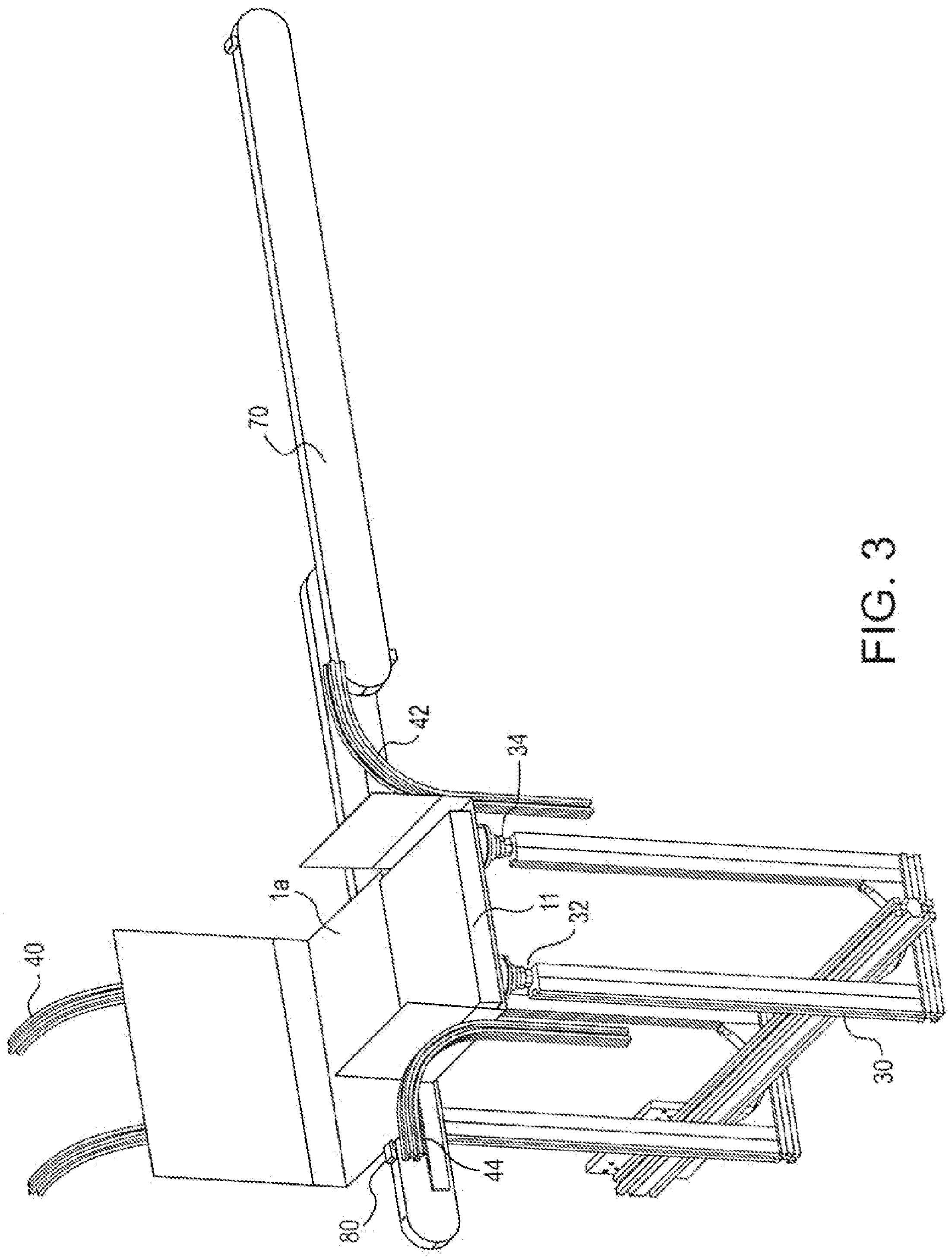
FIG. 3 shows a cut-away, partial view of the apparatus in FIG. 2 at the point in its process of individually packaging a product when its partially-erected packaging carton has progressed to the point that it takes the shape of that shown in FIG. 1B.

Strategically placed guides that are located proximate to the downward line of movement of this blank and so that the carton's outer top 2, rear side 3, inner bottom right 9 and left side 10 panels come into contact with these guides and are folded 90 degrees upward so as to present a partially erected carton when it arrives in the frame's first working area. A product 11 can then be inserted through the frame's front surface and into this partially erected carton so that the product lies on the partially erected carton's inner top 6 panel. See FIG. 3.

These guides consist of (a) a rear guide 40 that is configured and oriented in the frame to fold upwards and vertical the outer top and rear side panels, (b) a right side guide 42 that is configured and oriented in the frame to fold upwards and vertical the inner bottom, right flap and right side panels, and a left side guide 44 that is configured and oriented in the frame to fold upwards and vertical the inner bottom, left flap and left side panels.

Figure 4:
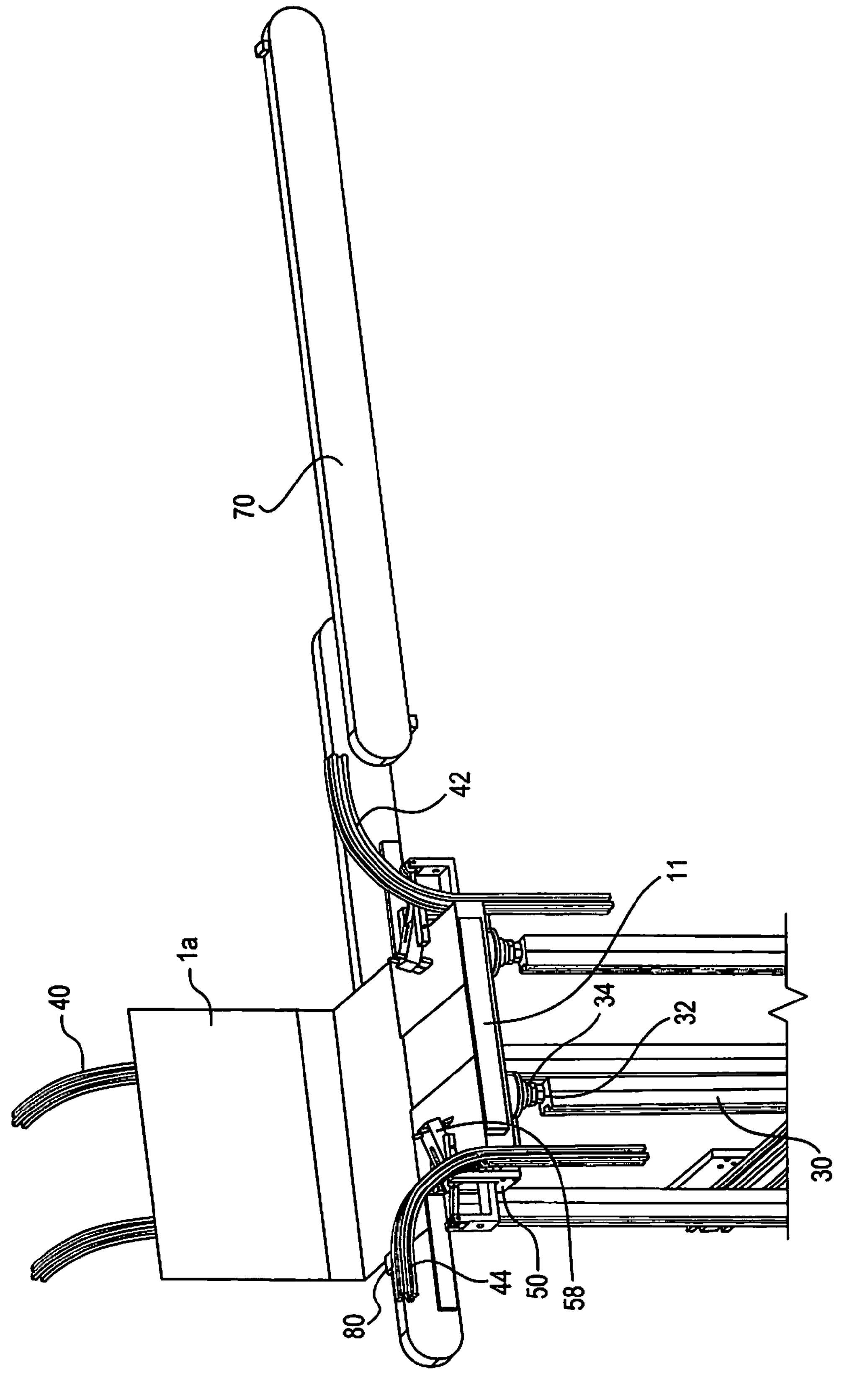
FIG. 4 shows a cut-away, partial view of the apparatus in FIG. 2 at the next point in its process of individually packaging a product when its partially-erected packaging carton has progressed to the step of folding down the carton's flaps.

When this partially erected carton descends to the bottom of this first working area the distal side of its inner top panel comes to rest on the top surface of a rotatable platform 50. This platform has top 52, bottom 52*a*, right 54 and left 56 side surfaces and a configuration and mounting arrangement adapted to situate the platform's top surface below the carton blank and to allow for the platform to be affixed to the so that its axis of rotation is parallel to that of the frame's x-axis. The platform's right and left side surfaces also have affixed to each of them a movable pusher 58 that has a configuration adapted so as to move the pushers both towards and away from each other in such a manner as to fold the carton's inner bottom right 9 and left side 10 flaps towards each other and through a fold of 90 degrees so that these flaps lie on top of the product that was inserted onto the proximal side of the carton's inner top 6 panel. See FIG. 4.

Figure 5:
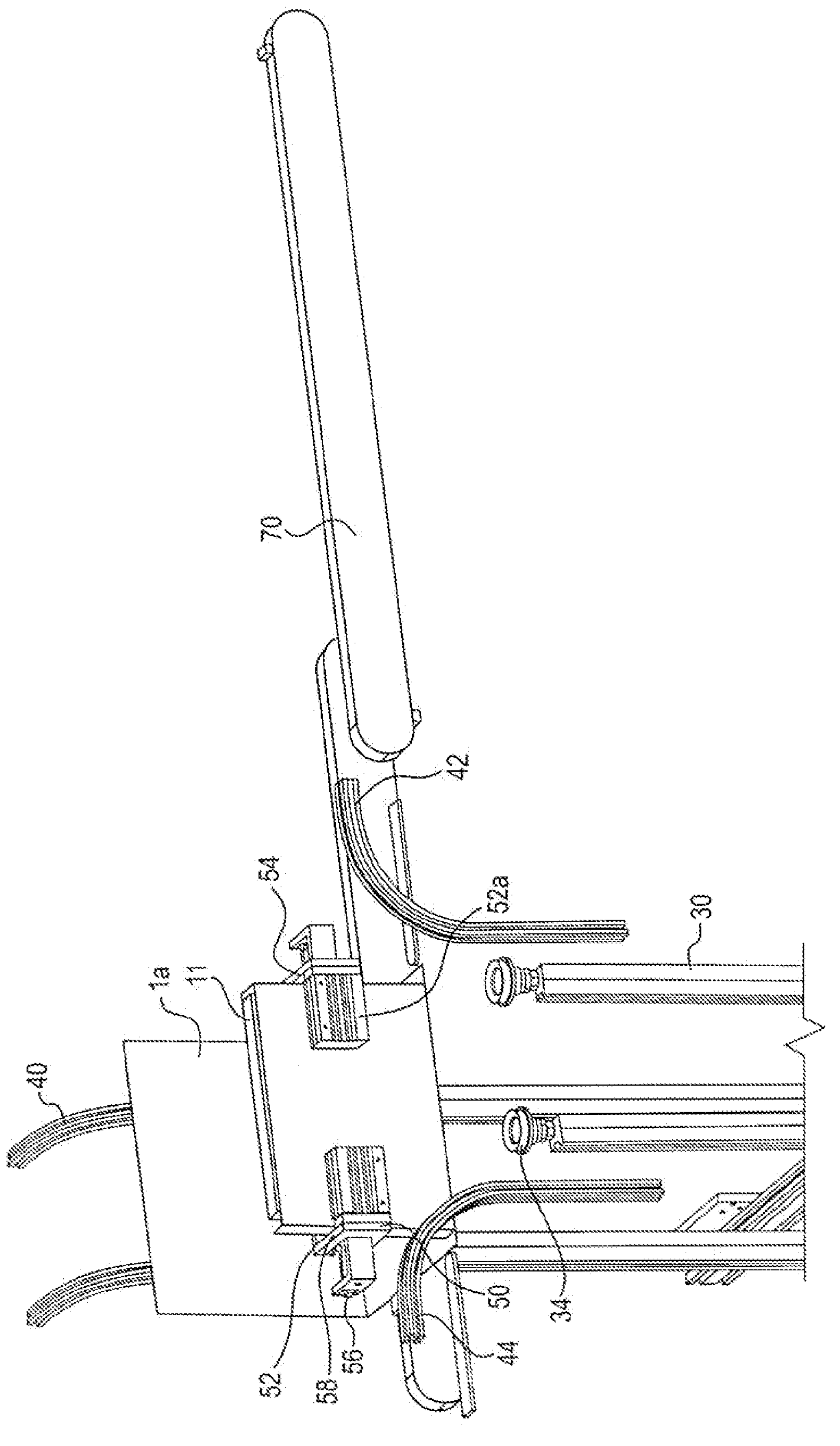
FIG. 5 shows a cut-away, partial view of the apparatus in FIG. 2 at the next point in its process of individually packaging a product when its partially-erected packaging carton has progressed to the step of rotating 90 degrees the package-containing panels of the carton.
Figure 6:
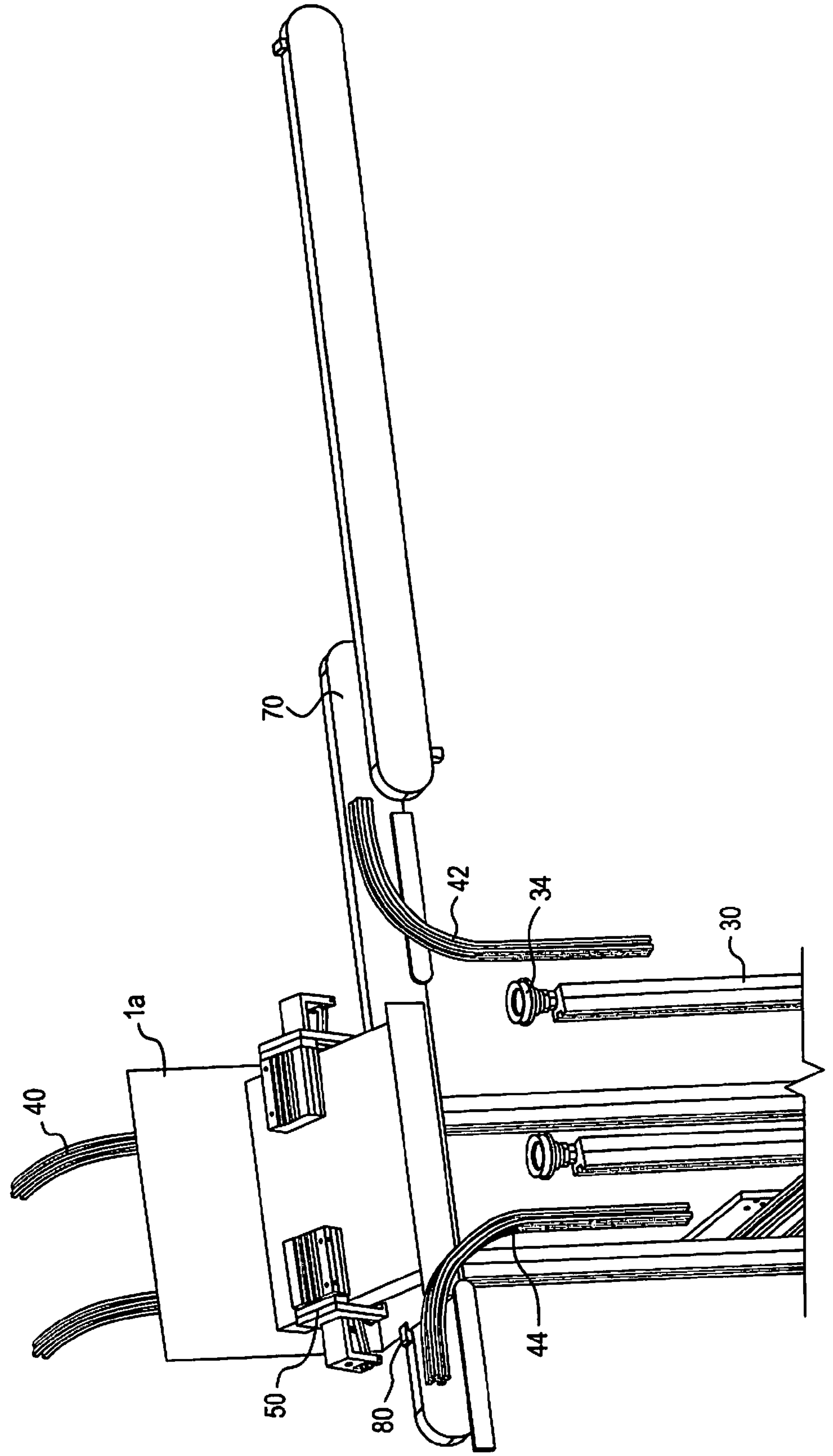
FIG. 6 shows a cut-away, partial view of the apparatus in FIG. 2 at the next point in its process of individually packaging a product when its partially-erected packaging carton has progressed to the step of rotating the package-containing panels of the carton another 45 degrees.

The platform's mounting arrangement is adapted to allow the platform to move through a rotational angle of approximately 135 degrees about its x-axis aligned axis of rotation. This serves to further fold and close the partially erected carton by moving the carton's inner top 6, right 7 and left 8 side, inner bottom right side 9 and left side 10 flaps and front side 5 panels through an angle of 90 degrees. See FIG. 5. These panels are then moved through an additional angle of 45 degrees so that the now mostly, carton-enclosed product is situated above the carton's outer bottom panel 4. See FIG. 6.

Figure 7:
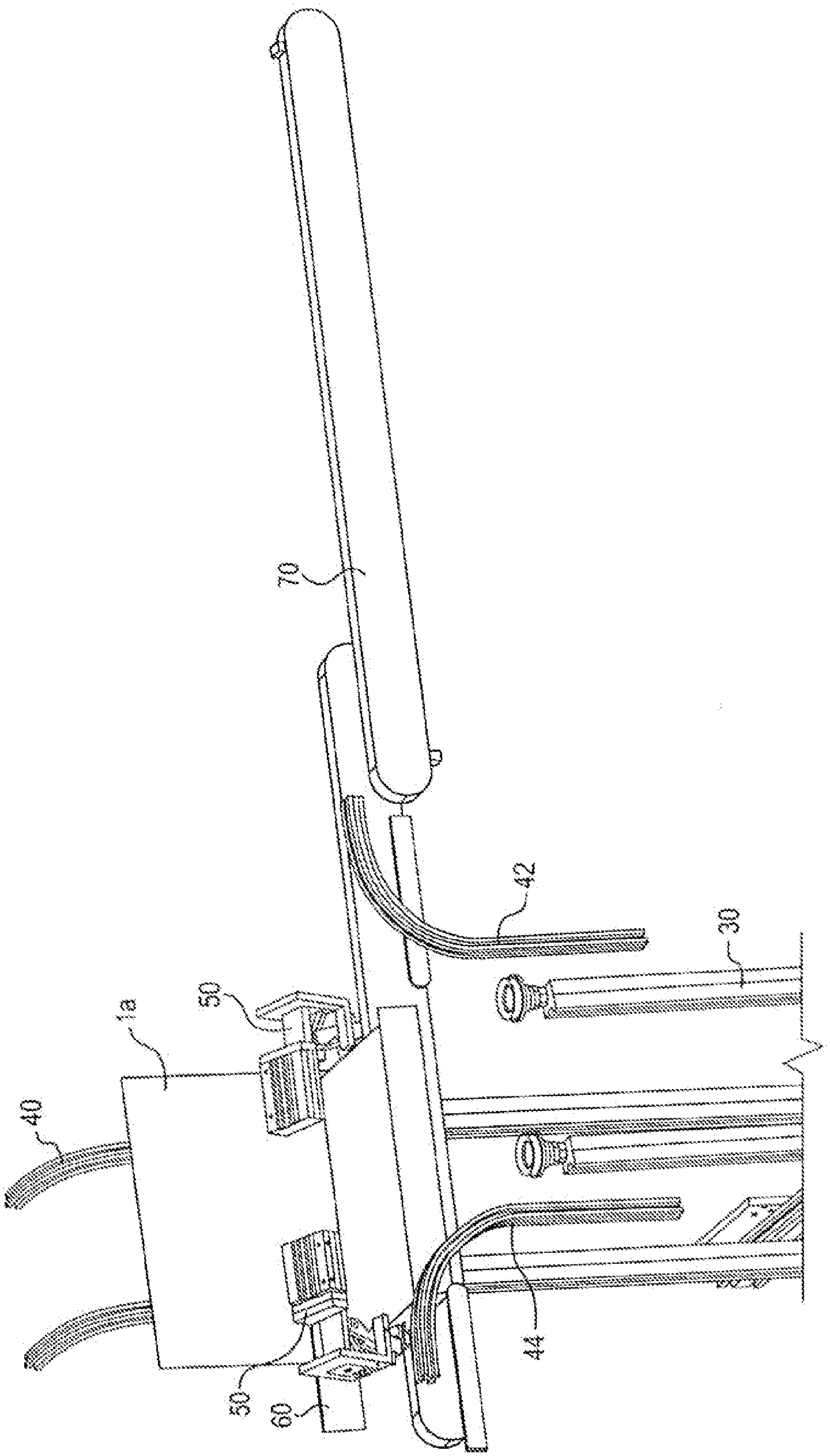
FIG. 7 shows a cut-away, partial view of the apparatus in FIG. 2 at the next point in its process of individually packaging a product when its partially-erected packaging carton has progressed to the next step of having a lever arm push the package-containing panels of the carton down so that they lie on the carton's underlying panel.

A rotatable lever arm 60 or other suitable means is situated to the left side of the carton's outer bottom panel 4 and is configured to allow this lever arm to rotate downward and come into contact with the distal side of the carton inner top panel 6 and continue the folding downward of this partially erected until its inner bottom right 9 and left side 10 flaps come into contact with the carton's outer bottom panel 4. See FIG. 7.

A track 70 or other suitable support and transport means is situated below that part of this first working area of the apparatus that is beneath the carton's outer bottom panel 4 as it was initially horizontally situated on the top surface the frame. This track is configured to guide the movements of this now almost totally erected carton as it carton moves from this first working area and towards the right side of the frame and into a second working area where glue is applied to the top of the carton's inner top 6 panel as the carton is prepared for being sealed. A suitable drive mechanism 80 is used to move the carton along this track.

Figure 8:
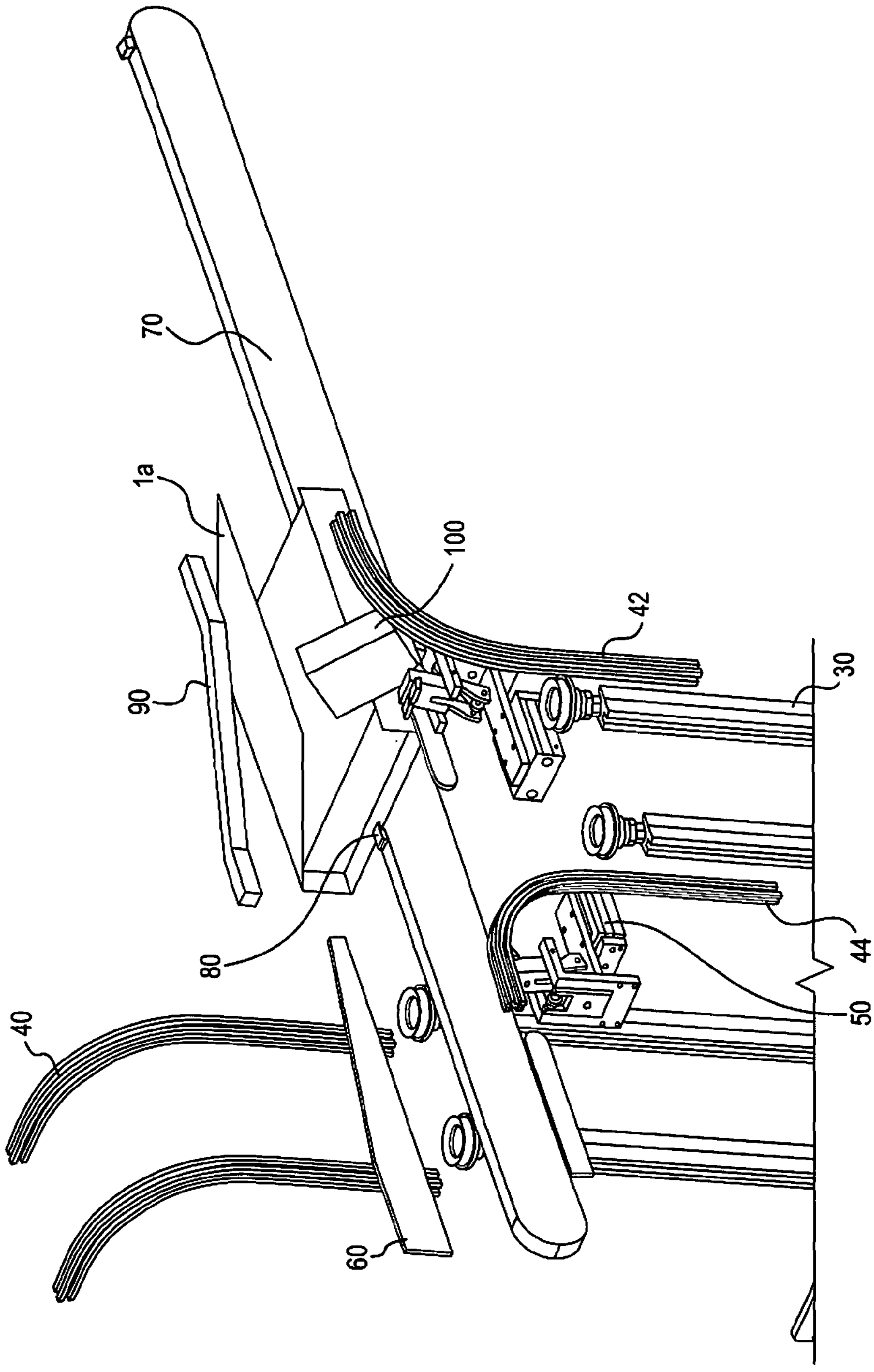
FIG. 8 shows a cut-away, partial view of the apparatus in FIG. 2 at the next point in its process of individually packaging a product when its partially-erected packaging carton has progressed to being moved from the first to the second working area of the apparatus and its last vertical panel has been moved down 45 degrees in anticipation of glue being applied to the carton's exposed horizontal panel.

An outer top guide 90 is situated proximate to the carton's line of movement between these first and second working areas and configured so that it comes into contact with the distal side of the carton's outer top panel and moves or folds it downward through an angle of approximately 45 degree as the carton moves on the track to the frame's second working area. See FIG. 8. A glue applicator 100 located proximate this second working area is configured to apply glue to the distal side of the carton's inner top panel when said carton is moving through this frame second working area.

The apparatus' drive mechanism 80 is further configured to continue to move the carton along the frame's track to a third working area which is situated closer to the frame's right side and where the carton's outer top panel 2 is pressed downward until it comes into contact with the glue that was placed on the carton's inner top panel and thereby seals the carton.

Figure 9:
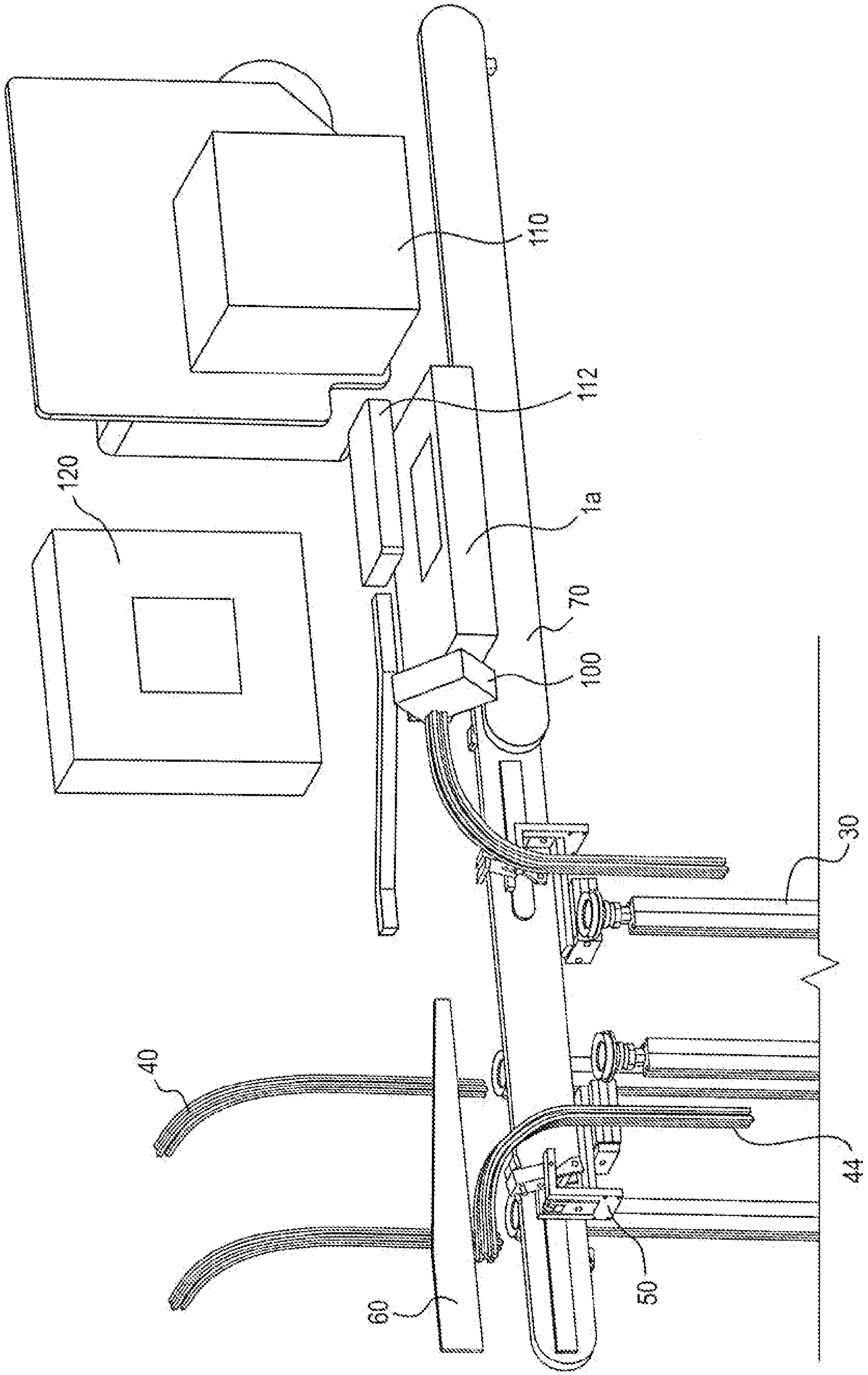
FIG. 9 shows a cut-away, partial view of the apparatus in FIG. 2 at the next point in its process of individually packaging a product when its partially-erected packaging carton has progressed to being moved from the second to the third working area of the apparatus and the carton has been sealed and a mailing label attached.

Located above this third working area is a mailing label applicator 110 which has a vertically movable applicator head 112 that can serve the dual purpose of pushing down the carton's outer top panel 2 while affixing to the distal surface of this panel a mailing label that has been prepared and printed by the mailing label applicator. Such mailing label applicators are well known in the art and therefore will not be discussed in any detail herein. See FIG. 9.

The apparatus of the present invention also has a control system 120 which is used to control the overall operation of the apparatus, including the properly timed motion of its various moving parts. Such control systems are well known in the art and consist of a plurality of electronic sensors located on various parts of the frame that collect various information (orientation or location of a moving part or that of the carton blank or its partially erected form) that is fed into a programmable controller which is programmed to control the operation of the apparatus and its moving parts (e.g., vertical drive, vacuum suction head, rotatable platform, movable pushers, rotatable lever arm, drive mechanism, glue applicator and mailing label applicator) so as to partially erect the carton for the insertion of a product, followed by the continued folding and sealing of the carton and the affixing thereto of a mailing label and the discharge of the carton out the right side of the apparatus's frame.

It should be noted that the present invention and its programmable controller is unique in its manner of operation. To prevent packing mistakes and waste, the apparatus' controller and mailing label applicator are configured such that they receive their operational instructions from a controlling external source, e.g., the computers which control the order taking, the checking of manufacturing inventory of product ready for shipment, and the financial qualification of an order (e.g., does the potential customer have credit with the product manufacturer or have sufficient pre-payments been made to guarantee payment for a requested order). This external source is tasked with the responsibility for ensuring that all mailing label requests are validated before these requests are passed along to the packaging device or apparatus of the present invention.

To validate a mailing label request will usually entail a number of checks: (a) some assurance that the product's cost has been or will be paid, (b) assurance that the product is in stock and ready to be shipped, (c) assurance the mailing address to which the product is to be shipped is valid (e.g., if the carton is to be shipped via a major shipping service, e.g., UPS, then assurance is gotten from UPS that the mailing label to be created is to a valid address to which UPS can and will deliver). Only once the mailing label request has been validated and the mailing label applicator has the direction to print such a validated mailing label is a control signal sent to the apparatus or its intake mechanism to begin the process of bringing a new a carton blank downward to begin the process of creating the carton to which this validated mailing label will be affixed.

While the above variant of the present invention was demonstrated using a nine-panel, T-fold, carton blank, it should be recognized that the present invention can be adapted to be used with T-fold, carton blanks that have other than nine panels. It can also be adapted to be used with carton blanks that have other than the exact shape of a t-fold carton.

It should also be understood that each element or component of the apparatus of this application, and combinations of these elements, can be implemented by general and/or special purpose hardware that performs the specified functions or steps associated with the elements described above.

Furthermore, the foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is set forth hereafter in this application's claims.

I claim:

1. An apparatus for automatically erecting, from a t-fold, multi-panel, carton blank that serves as the input for said apparatus, a carton for the insertion of a to-be-packaged product and then the folding, sealing and mailing address labeling of said carton, and with each of said panels having a proximal and distal surface that are named such that the proximal side of any panel is the one which is closest to the product once said product has been inserted into said carton, said apparatus comprising:

a frame having a front, rear, top, bottom, right and left side surfaces that form the boundaries for said apparatus, and a configuration that enables said frame to hold a plurality of said t-fold, carton blanks on the top surface of said frame, said frame also having a defined orthogonal set of axes with a x-axis that extends from said left to the right side of said frame, a y-axis that extends from the bottom to the top of said frame, and a z-axis that extends from the rear to the front of said frame, an intake mechanism having a distal end that has a configuration that enables said distal end to grasp the distal side of said t-fold, carton blank when said blank is located on said frame top surface and then to move said carton blank into said apparatus, a plurality of guides that fold upwards a plurality of the panels of said carton when said carton blank is being moved into said apparatus so as to create a partially-erected carton for the insertion of the product which said carton is to package, a rotatable platform having a configuration that enables said rotatable platform to rotate, after said to-be-packaged product has been inserted into said partially-erected carton, said partially-erected carton and said inserted product so as to further fold one or more of said carton panels, a glue applicator situated in said frame and having a configuration that enables said glue applicator to apply glue to one of said carton panels, a mailing label applicator having a vertically movable head and a configuration that enables said vertically movable head to move downward to come into contact with the distal side of one said carton panels and affix a mailing label to said distal side of said carton panel, and a control system having a plurality of sensors and a programmable controller, said system having a configuration that enables said system to control the motion and coordination of the actions of said intake mechanism, the distal end of said intake mechanism, rotatable platform, glue applicator and mailing label applicator.

2. The apparatus as recited in claim 1, wherein said programmable controller having a configuration that enables the initiation of the action of said apparatus only after said programmable controller receives from an external source a request for the creation of a validated mailing label.

3. The apparatus as recited in claim 2, wherein:

said carton blank having nine panels including an outer top, a rear side, an outer bottom, a front side, an inner top, a right side, a left side, an inner bottom right flap and an inner bottom left flap, said plurality of guides including a rear guide having a configuration adapted to fold upwards said carton outer top and rear side panels when said blank is moved into said apparatus so as to create a partially erected carton for the insertion of said to-be-packaged product onto the proximal side of said inner top panel, a right side guide having a configuration adapted to fold upwards said inner bottom, right flap and right side panel when said blank is moved into said apparatus, and a left side guide having a configuration adapted to fold upwards said inner bottom, left flap and left side panel when said blank is moved into said apparatus, said rotatable platform having top, bottom, right and left side surfaces, and said configuration of said rotatable platform further adapted to situate said rotatable platform top surface below the distal side of said carton inner top panel when said t-fold, carton blank is moved into said apparatus, said rotatable platform also having a mounting arrangement adapted to affix said platform to said frame so that said rotatable platform has an axis of rotation that is parallel to said frame x-axis, said apparatus further comprising a pair of movable pushers affixed to said rotatable platform and having a configuration adapted to move said pushers towards each other in such a manner as to fold said inner bottom right and inner bottom left flaps towards each other so that said flaps lie on the top of said to-be-packaged product that was inserted onto the proximal side of said inner top panel, and wherein said configuration of said rotatable platform mounting arrangement further adapted to allow said platform to move through an angle that is sufficient to situate said inserted product, and said panels of the partially erected carton that are then in contact with said inserted product, above said carton outer bottom panel.

4. The apparatus as recited in claim 3, wherein:

said frame having a first, second and third working areas that are aligned one after the other along said x-axis of said frame, and said apparatus further comprising a track having first, second and third portions which are situated below said respective working areas of said apparatus and with said first track portion beneath the outer bottom panel of said carton when said carton blank is horizontally situated on the top surface of said frame, and said track having a configuration adapted to guide the movements of said carton as said carton moves towards the right side of said frame as said carton is sealed and has affixed thereto said mailing label.

5. The apparatus as recited in claim 4, wherein said glue applicator situated in said frame second working area.

6. The apparatus as recited in claim 5, wherein said mailing label applicator situated in said frame third working area.

7. The apparatus as recited in claim 4, wherein said mailing label applicator situated in said frame third working area.

8. The apparatus as recited in claim 4, said apparatus further comprising a drive mechanism having a configuration adapted to move said carton along said track and between said working areas.

9. The apparatus as recited in claim 8, wherein said mailing label applicator situated in said frame third working area.

10. The apparatus as recited in claim 1, wherein:

said carton blank having nine panels including an outer top, a rear side, an outer bottom, a front side, an inner top, a right side, a left side, an inner bottom right flap and an inner bottom left flap, said plurality of guides including a rear guide having a configuration adapted to fold upwards said carton outer top and rear side panels when said blank is moved into said apparatus so as to create a partially erected carton for the insertion of said to-be-packaged product onto the proximal side of said inner top panel, a right side guide having a configuration adapted to fold upwards said inner bottom, right flap and right side panel when said blank is moved into said apparatus, and a left side guide having a configuration adapted to fold upwards said inner bottom, left flap and left side panel when said blank is moved into said apparatus, said rotatable platform having top, bottom, right and left side surfaces, and said configuration of said rotatable platform further adapted to situate said rotatable platform top surface below the distal side of said carton inner top panel when said t-fold, carton blank is moved into said apparatus, said rotatable platform also having a mounting arrangement adapted to affix said platform to said frame so that said rotatable platform has an axis of rotation that is parallel to said frame x-axis, said apparatus further comprising a pair of movable pushers affixed to said rotatable platform and having a configuration adapted to move said pushers towards each other in such a manner as to fold said inner bottom right and inner bottom left flaps towards each other so that said flaps lie on the top of said to-be-packaged product that was inserted onto the proximal side of said inner top panel, and wherein said configuration of said rotatable platform mounting arrangement further adapted to allow said platform to move through an angle that is sufficient to situate said inserted product, and said panels of the partially erected carton that are then in contact with said inserted product, above said carton outer bottom panel.

11. The apparatus as recited in claim 10, wherein:

said frame having a first, second and third working areas that are aligned one after the other along said x-axis of said frame, and said apparatus further comprising a track having first, second and third portions which are situated below said respective working areas of said apparatus and with said first track portion beneath the outer bottom panel of said carton when said carton blank is horizontally situated on the top surface of said frame, and said track having a configuration adapted to guide the movements of said carton as said carton moves towards the right side of said frame as said carton is sealed and has affixed thereto said mailing label.

12. The apparatus as recited in claim 11, wherein said glue applicator situated in said frame second working area.

13. The apparatus as recited in claim 12, said apparatus further comprising:

a means having a distal end and situated proximate said carton outer bottom panel when said carton is in said frame first working area and having a configuration adapted to allow said distal end of said means to come into contact with said distal side of said carton inner top panel and continue the folding downward of said carton inner top panel until said carton inner bottom right and left side flaps come into contact with said carton outer bottom panel before said carton arrives in said frame second working area, and an outer top guide having a configuration that folds downward said outer top panel as said carton moves on said track to said second working area.

14. The apparatus as recited in claim 11, wherein said mailing label applicator situated in said frame third working area.

15. The apparatus as recited in claim 14, said apparatus further comprising:

a means having a distal end and situated proximate said carton outer bottom panel when said carton is in said frame first working area and having a configuration adapted to allow said distal end of said means to come into contact with said distal side of said carton inner top panel and continue the folding downward of said carton inner top panel until said carton inner bottom right and left side flaps come into contact with said carton outer bottom panel before said carton arrives in said frame second working area, and an outer top guide having a configuration that folds downward said outer top panel as said carton moves on said track to said second working area.

16. The apparatus as recited in claim 11, said apparatus further comprising:

a means having a distal end and situated proximate said carton outer bottom panel when said carton is in said frame first working area and having a configuration adapted to allow said distal end of said means to come into contact with said distal side of said carton inner top panel and continue the folding downward of said carton inner top panel until said carton inner bottom right and left side flaps come into contact with said carton outer bottom panel before said carton arrives in said frame second working area, and an outer top guide having a configuration that folds downward said outer top panel as said carton moves on said track to said second working area.

17. The apparatus as recited in claim 11, said apparatus further comprising a drive mechanism having a configuration adapted to move said carton along said track and between said working areas.

18. The apparatus as recited in claim 17, said apparatus further comprising:

a means having a distal end and situated proximate said carton outer bottom panel when said carton is in said frame first working area and having a configuration adapted to allow said distal end of said means to come into contact with said distal side of said carton inner top panel and continue the folding downward of said carton inner top panel until said carton inner bottom right and left side flaps come into contact with said carton outer bottom panel before said carton arrives in said frame second working area, and an outer top guide having a configuration that folds downward said outer top panel as said carton moves on said track to said second working area.

19. The apparatus as recited in claim 17, wherein said mailing label applicator situated in said frame third working area.

20. A method for automatically erecting, from a t-fold, multi-panel, carton blank that serves as the input for said method, a carton for the insertion of a to-be-packaged product and then the folding, sealing and mailing address labeling of said carton, and with each of said panels having a proximal and distal surface that are named such that the proximal side of any panel is the one which is closest to the product once said product has been inserted into said carton, said method comprising the steps of:

utilizing a frame having a front, rear, top, bottom, right and left side surfaces that form the boundaries for said apparatus, and a configuration that enables said frame to hold a plurality of said t-fold, carton blanks on the top surface of said frame, said frame also having a defined orthogonal set of axes with a x-axis that extends from said left to the right side of said frame, a y-axis that extends from the bottom to the top of said frame, and a z-axis that extends from the rear to the front of said frame, utilizing an intake mechanism having a distal end that has a configuration that enables said distal end to grasp the distal side of said t-fold, carton blank when said blank is located on said frame top surface and then to move said carton blank into said apparatus, utilizing a plurality of guides that fold upwards a plurality of the panels of said carton when said carton blank is being moved into said apparatus so as to create a partially-erected carton for the insertion of the product which said carton is to package, utilizing a rotatable platform having a configuration that enables said rotatable platform to rotate, after said to-be-packaged product has been inserted into said partially-erected carton, said partially-erected carton and said inserted product so as to further fold one or more of said carton panels, utilizing a glue applicator situated in said frame and having a configuration that enables said glue applicator to apply glue to one of said carton panels, utilizing a mailing label applicator having a vertically movable head and a configuration that enables said vertically movable head to move downward to come into contact with the distal side of one said carton panels and affix a mailing label to said distal side of said carton panel, and utilizing a control system having a plurality of sensors and a programmable controller, said system having a configuration that enables said system to control the motion and coordination of the actions of said intake mechanism, the distal end of said intake mechanism, rotatable platform, glue applicator and mailing label applicator.

* * * * *